United States Patent

[11] 3,589,026

| [72] | Inventors | Richard H. Hall<br>Franklin, Tenn.;<br>Thomas P. Duffy, Hazelwood, Mo. |
|---|---|---|
| [21] | Appl. No. | 877,383 |
| [22] | Filed | Nov. 17, 1969 |
| [45] | Patented | June 29, 1971 |
| [73] | Assignee | Western Textile Products Company<br>St Louis, Mo. |

[54] MATERIAL HANDLING DEVICE
19 Claims, 9 Drawing Figs.

[52] U.S. Cl. ..................................................... 34/42,
34/148, 34/151, 34/163
[51] Int. Cl. ..................................................... F26b 13/00

[50] Field of Search............................................ 34/12, 42,
58, 148, 150, 163, 236

[56] References Cited
UNITED STATES PATENTS
| 3,239,944 | 3/1966 | Gebert | 34/150 X |
| 3,418,725 | 12/1968 | Ruud | 34/164 X |

*Primary Examiner* — Kenneth W. Sprague
*Attorney* — Kingsland, Rogers, Ezell, Eilers and Robbins

ABSTRACT: A device oscillates one end of a multiply bundle, which has had the edges thereof treated with a sealant, to cause those edges to "work", and thereby permits that sealant to dry without bonding those edges together.

FIG. 3.

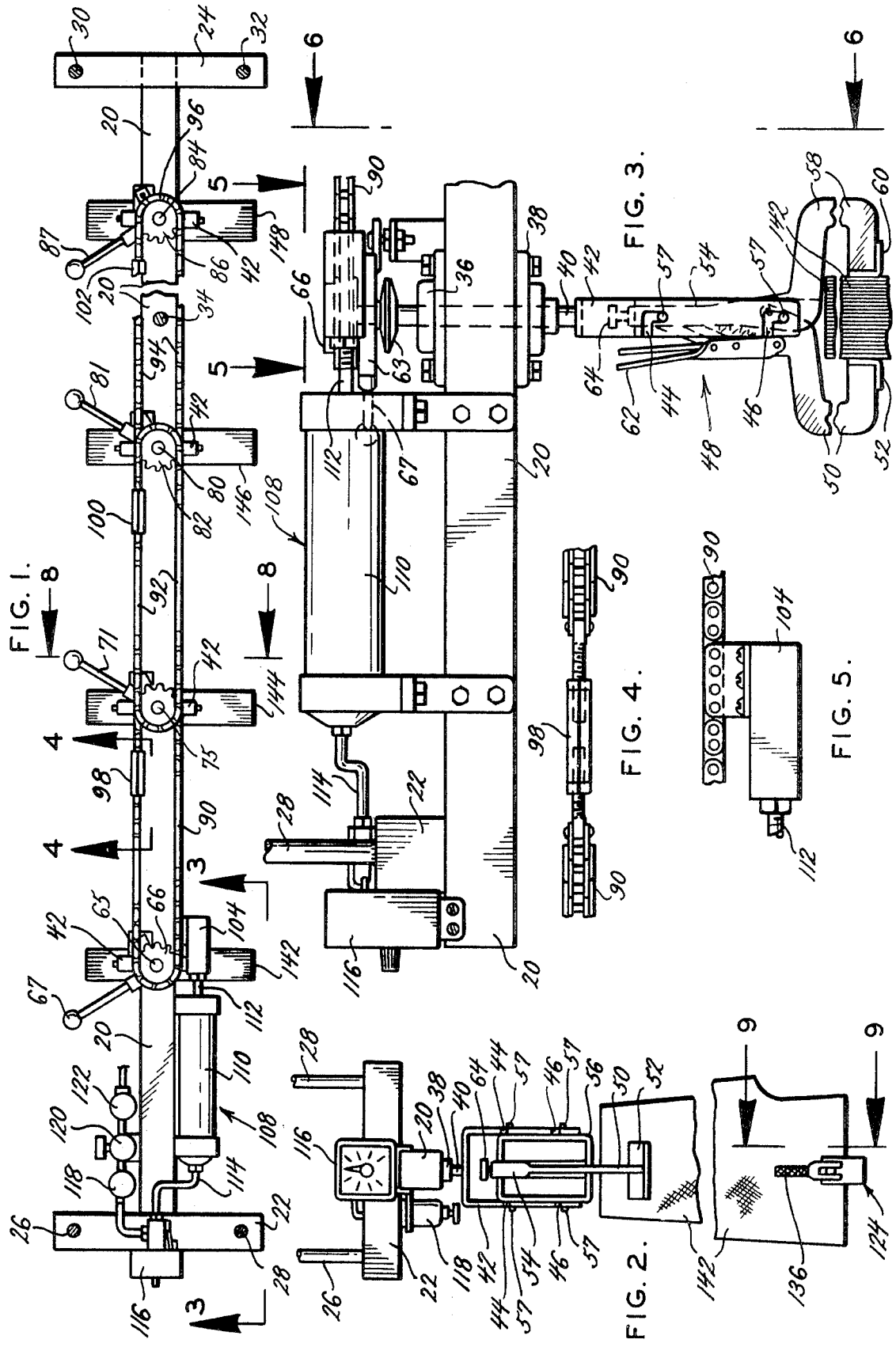

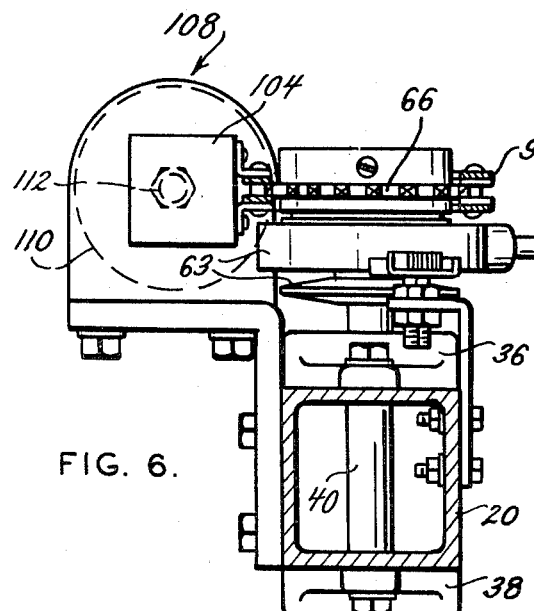
FIG. 6.
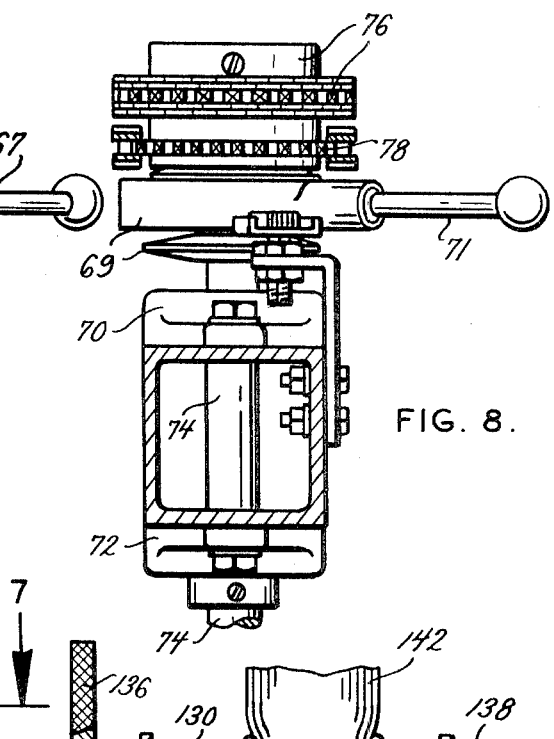
FIG. 8.
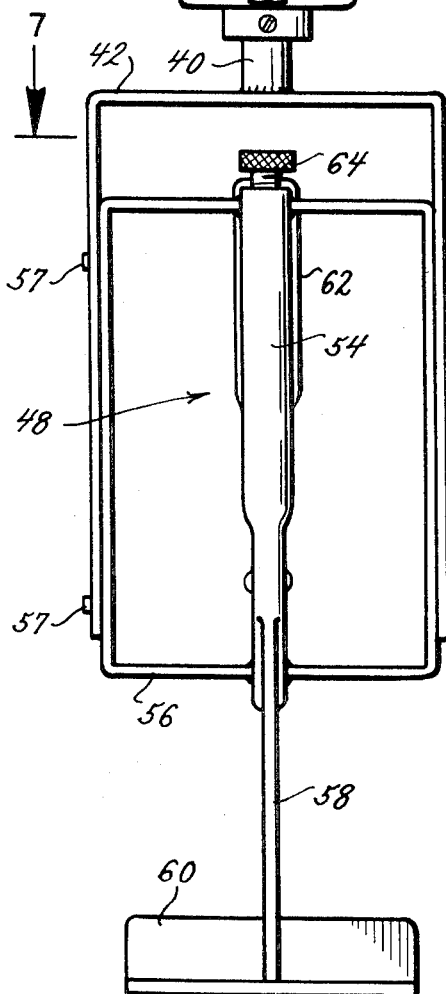
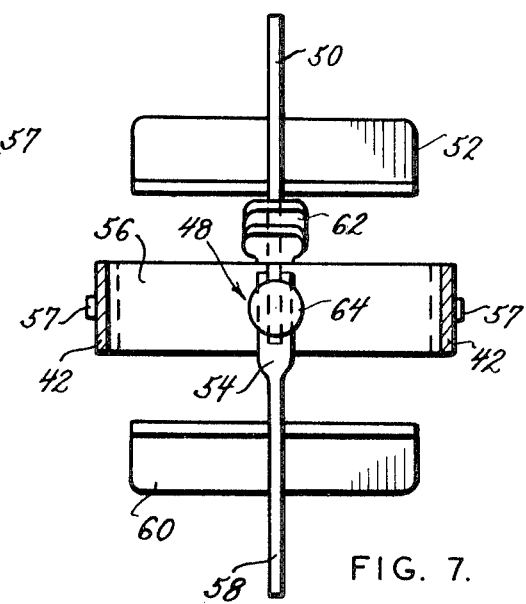
FIG. 9.
FIG. 7.

MATERIAL HANDLING DEVICE

This invention relates to improvements in material handling devices. More particularly, this invention relates to improvements in devices which permit sealants, that have been applied to the edges of a multi-ply bundle, to dry without bonding those edges together.

It is, therefore, an object of the present invention to provide an improved device which permits sealants, that have been applied to the edges of a multi-ply bundle, to dry without bonding those edges together.

It is customary in the clothes-making industry to place a number of layers of cloth atop each other and then use power-operated cutting devices to cut those layers of cloth into multi-ply bundles of the desired sizes and configurations. Because the cutting of the various layers of cloth produces edges which can subsequently tend to fray, it is customary to spray the elongated, cut edges of the multi-ply bundles with a sealant which will tend to keep those edges from fraying. While sealants are very desirable, because they minimize the tendency of the elongated, cut edges of the layers of cloth to fray, those sealants tend, as they dry, to cause the elongated, cut edges of the adjacent plies of the multi-ply bundles to bond together; and, in some instances, those sealants have made it necessary to manually strip each ply away from the adjacent plies of the multi-ply bundles to free the elongated, cut edges of the various plies from each other. The manual stripping of each ply away from the adjacent plies of the multi-ply bundles is burdensome and time consuming; and, in most instances, the manual stripping away of the plies must be done before the sealant dries, lest the edges of the stripped-away plies tend to adhere to, and then to fray, the edges of the plies of the bundles. Consequently, it would be desirable to provide a device which could permit sealants, that have been applied to the elongated, cut edges of a multi-ply bundle, to dry without bonding those edges together.

The device provided by the present invention grips one end of each multi-ply bundle and recurrently oscillates that end. That device permits the other end of each multi-ply bundle to oscillate; and it enables that other end to respond to its own weight or to an attached weight to successively lag behind and then rotate farther than the one end of that multi-ply bundle. As a result, the ends of each multi-ply bundle will recurrently assume individually different angular positions; and the resulting "working" of the edges of that multi-ply bundle will enable the sealant thereon to dry without bonding those edges to each other. It is, therefore, an object of the present invention to provide a device which recurrently oscillates the ends of a multi-ply bundle to cause those ends to recurrently assume individually different angular positions.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1 is a partially broken, partially sectioned, plan view of one preferred embodiment of material-handling device that is made in accordance with the principles and teachings of the present invention, FIG. 2 is a partially broken, elevational view of the left-hand end of the material handling device shown in FIG. 1, FIG. 3 is a partially broken elevational view, on a larger scale, of a portion of one side of the material-handling device shown in FIG. 1, and it is taken along the plane indicated by the line 3-3 in FIG. 1, FIG. 4 is a side elevational view, on the scale of FIG. 3, of another portion of the material-handling device shown in FIG. 1, and it is taken along the plane indicated by the line 4-4 in FIG. 1, FIG. 5 is a plan view, on the scale of FIG. 3, of a portion of the material-handling device shown in FIG. 1, and it is taken along the plane indicated by the line 5-5 in FIG. 3, FIG. 6 is a sectional view, on a still larger scale, through the material-handling device of FIG. 1, and it is taken along the plane indicated by the line 6-6 in FIG. 3, FIG. 7 is a sectional view, on the scale of FIG. 6, through the material-handling device of FIG. 1, and it is taken along the plane indicated by the line 7-7 in FIG. 6, FIG. 8 is a sectional view, on the scale of FIG. 6, through the material-handling device of FIG. 1, and it is taken along the plane indicated by the line 8-8 in FIG. 1, and FIG. 9 is a partially broken, partially sectioned, side view, on the scale of FIG. 6, of the lower part of a multi-ply bundle and of a weight attached thereto, and it is taken along the plane indicated by the line 9-9 in FIG. 2.

Referring to the drawing in detail, the numeral 20 denotes an elongated supporting element of a material-handling device; and that supporting element is tubular in configuration. A transversely directed element 22 is fixedly secured adjacent one end of the supporting element 22, and a transversely directed element 24 is fixedly secured adjacent the other end of that supporting element. The transversely directed elements 22 and 24 can be welded, bolted or otherwise fixedly secured to the supporting element 20; and, where that is done, the supporting element 20 and those transversely directed elements will constitute a sturdy and rugged frame for the material-handling device of the present invention.

The numerals 26, 28, 30, 32 and 34 denote rods which extend upwardly from the frame constituted by the supporting element 20 and the transversely directed elements 22 and 24; and the upper ends of those rods will be secured to the ceiling or to a subframe below the ceiling of the building in which the material-handling device is operated. Specifically, the rods 26 and 28 extend upwardly from the opposite ends of the transversely directed element 22, the rods 30 and 32 extend upwardly from the opposite ends of the transversely directed element 24, and the rod 34 extends upwardly from the supporting element 20.

The numeral 36 denotes a bearing block which is secured to the upper surface of the supporting element 20 adjacent a vertically directed opening through that supporting element; and the numeral 38 denotes a bearing block which is secured to the bottom of that supporting element adjacent that opening. Those bearing blocks support bearings that rotatably hold a shaft 40, which has the upper end thereof extending upwardly above the bearing block 36 and which has the lower end thereof depending downwardly from the bearing block 38. An inverted U-shaped bracket 42 is secured to the lower end of the shaft 40, as by welding; and that inverted U-shaped bracket has L-shaped notches 44 in the upper portion thereof and has L-shaped notches 46 in the lower portion thereof. As shown particularly by FIG. 3, the L-shaped notches 44 and 46 extend to the same edge of the inverted U-shaped bracket 42.

The numeral 48 generally denotes a vise grip clamp; and that vise grip clamp has a jaw 50 with an elongated bundle-engaging surface 52 at the lower end thereof. As shown particularly by FIG. 3, that bundle-engaging surface is an angle iron. The upper end of the jaw 50 has a gripping portion 54; and that gripping portion extends through, and is fixedly secured to, the upper end of a rectangular frame 56. The lower part of that gripping portion extends through, and is secured to, the bottom of that rectangular frame. That rectangular frame has four pins 57 which extend outwardly from the sides thereof, and those pins can be disposed within the L-shaped slots 44 and 46 to removably hold that rectangular frame in assembled relation with the inverted U-shaped bracket 42. The numeral 58 denotes the second jaw of the vise grip clamp 48; and that jaw has a bundle-engaging surface 60. As shown particularly by FIG. 3, that bundle-engaging surface is an angle iron. A gripping portion 62 is provided at the upper end of the jaw 58; and an adjusting screw 64 is provided at the upper end of the gripping portion 54 of the jaw 50. The vise grip clamp 48 is a commercially available vise grip clamp, such as a 011 vise grip clamp of Peterson Mfg. Co.; but it has been modified by the addition thereto of the bundle-engaging surfaces 52 and 60, and by the securement thereof to the rectangular frame 56. Adjustment of the position of the adjusting screw 64 will determine the size of the multi-ply bundle which can be gripped and held by the vise grip clamp 48; and, once that vise grip clamp has been clamped in engagement with a multi-ply bundle, it will remain in engagement with that multi-ply bundle until it is released by the operator of the material-handling device.

The numeral 63 denotes a clutch which is mounted above the level of the elongated supporting element 20 and in register with the bearing block 36; and the driven member of that clutch is fixedly secured to the upper end of the shaft 40. The driving member of the clutch 63 is fixedly secured to the lower end of a shaft 65; and a sprocket pinion 66 is suitably secured to the upper end of the shaft 65. The clutch 63 is equipped with a handle 67; and, whenever that handle is shifted into the position indicated by FIG. 1, that clutch will respond to rotation of sprocket pinion 66 and shaft 65 to rotate the shaft 40. However, whenever the handle 67 is shifted in the clockwise direction from the position indicated by FIG. 1, the clutch 63 will permit the shaft 40 to come to rest. While different clutches could be used, the 0CA1-300 M6 clutch assembly of the Formsprag Company has been found to be quite useful. Whenever the handle 67 is in the position indicated by FIG. 1, rotation of the sprocket pinion 66 will rotate shaft 40, will rotate the inverted U-shaped bracket 42 secured to the bottom of that shaft, and will rotate the vise grip clamp 48—whenever the rectangular frame 56 has the pins 57 thereof set within the L-shaped slots 44 and 46 in that inverted U-shaped bracket.

Referring particularly to FIG. 8, the numeral 70 denotes a bearing block which is similar to the bearing block 36; and the bearing block 70 is secured to the upper surface of the supporting element 20 adjacent a further vertically directed opening through that supporting element. The numeral 72 denotes a bearing block which is similar to the bearing block 38; and the bearing block 72 is secured to the bottom of the supporting element 20 adjacent that further vertically directed opening. A shaft 74 is held by bearings which are supported by the bearing blocks 70 and 72; and, as shown particularly by FIG. 8, the upper end of the shaft 74 is fixedly secured to the driven member of a clutch 69. That clutch can be identical to the clutch 63, it has a handle 71, and it has the driving member thereof fixedly secured to a shaft 75. As shown by FIG. 1, the shaft 75 is disposed to the right of the shaft 65. A sprocket pinion 76 is suitably secured to the top of the shaft 75; and a sprocket pinion 78 is suitably secured to that shaft intermediate the sprocket pinion 76 and the clutch 69. An inverted U-shaped bracket 42 is secured to the bottom of the shaft 74, as by welding; and that inverted U-shaped bracket will releasably hold a rectangular frame 56 which supports a vise grip clamp 48.

The driving member of a further clutch, not shown, supports a shaft 80 which is disposed to the right of the shaft 75 in FIG. 1; and a sprocket pinion 82 is suitably secured to the top of that shaft. A sprocket pinion, not shown, is suitably secured to the shaft 80 intermediate the sprocket pinion 82 and the clutch for that shaft; and that sprocket pinion will be in register with the sprocket pinion 78 on the shaft 74. An inverted U-shaped bracket 42 is secured to the bottom of the shaft 65 which extends downwardly from the clutch driven by the shaft 80; and that inverted U-shaped bracket will releasably hold a rectangular frame 56 which supports a vise grip clamp 48. Whenever the handle 81 for that clutch is in the position indicated by FIG. 1, that inverted U-shaped bracket will be permitted to come to rest; but, whenever that handle is moved in the counterclockwise direction, that U-shaped bracket will be forced to rotate with the sprocket pinion 82.

Additional clutches, not shown, rotatably support additional shafts, not shown, to the right of the shaft 80. Additional pairs of sprocket pinions, not shown, will be secured to the upper ends of those shafts which are connected to the driving members of those clutches; and additional inverted U-shaped brackets, not shown, will be secured to the bottoms of those shafts which are connected to the driven members of those clutches. Those additional inverted U-shaped brackets will releasably hold rectangular frames which support additional vise grip clamps.

The driving member of a further clutch, not shown, rotatably supports a shaft 84 adjacent the right-hand end of the supporting element 20, as shown by FIG. 1. A sprocket pinion 86 is suitably secured to the upper end of that shaft; and an inverted U-shaped bracket 42 is secured to the bottom of the shaft, not shown, which depends downwardly from the driven member of that further clutch. That inverted U-shaped bracket will releasably hold a rectangular frame 56 which supports a vise grip clamp 48. Whenever the handle 87 of that further clutch is in the position indicated by FIG. 1, that further clutch will enable the shaft 84 to drive the inverted U-shaped bracket 42; but, whenever that handle is moved in the clockwise direction, that inverted U-shaped bracket can come to rest. Different numbers of rotatable shafts could be held by bearing blocks spaced along the length of the supporting element 20; but it has been found convenient to rotatably mount a total of six shafts on that supporting element.

The numerals 90, 92, 94 and 96 denote sprocket chains; and the sprocket chain 90 extends around, and meshes with the teeth on, the sprocket pinions 66 and 76. The sprocket chain 92 extends around, and meshes with the teeth on, the sprocket pinion 78 and the sprocket pinion, not shown, on the shaft 80 below the sprocket pinion 82. The sprocket chain 94 extends around, and meshes with the teeth on, the sprocket pinion 82 and a sprocket pinion, not shown, mounted at the top of a shaft, not shown, to the right of the shaft 80. The sprocket chain 96 extends around, and meshes with the teeth on, the sprocket pinion 86 and a sprocket pinion, not shown, at the top of a shaft, not shown, to the left of the shaft 84. A turnbuckle 98 is incorporated into the sprocket chain 90, a turnbuckle 100 is incorporated into the sprocket chain 92, a turnbuckle 102 is incorporated into the sprocket chain 96, a further turnbuckle, not shown, is incorporated into the sprocket chain 94, and an additional turnbuckle is incorporated into the sprocket chain, not shown, which extends around, and meshes with the teeth on, the lower sprocket pinions on the two shafts, not shown, between the shafts 80 and 84. The various turnbuckles will be used to maintain a desired degree of tightness in the various sprocket chains without requiring undue precision in the forming of the openings for the shafts 40 and 74 and the other shafts which depend downwardly from the driven members of the clutches.

The numeral 108 generally denotes an air motor; and that air motor has a cylinder 110 and a piston 112. A sprocket chain connector 104 is secured to the outer end of the piston 112 and to the sprocket chain 90 to enable that piston to move that sprocket chain. The air motor 108 includes a pipe 114, a timer 116, a lubricator 118, a pressure regulator 120, and a filter 122. While different air motors could be used, the BCAM-5C60 air motor of the Bellows-Valvair Company has been found to be very useful.

The numeral 124 generally denotes a weight which is securable to the lower end of a multi-ply bundle; and that weight is generally U-shaped in configuration, has a bushing 126 fixedly secured to one arm thereof, and has a nut 138 fixedly secured to the other arm thereof. A rod 132, which has a large diameter bundle-engaging surface 133 at the inner end thereof, is slidably held by the bushing 126; and a helical compression spring 130 surrounds the shank of that rod and urges that bundle-engaging surface inwardly of that weight. A pivot 134 rotatably secures the outer end of the rod 132 to a lever 136 which has a clevis at the lower end thereof; and that lever acts as a quick-release cam. The numeral 140 denotes a screw which is threaded into the nut 138; and that screw has a large diameter bundle-engaging surface 141 at the inner end thereof. That screw has a winglike gripping surface at the outer end thereof.

The numerals 142, 144, 146 and 148 denote multi-ply bundles which have had sealant applied to the long edges thereof. The multi-ply bundle 142 is supported by the U-shaped bracket 42 on the shaft 40, the multi-ply bundle 144 is supported by the U-shaped bracket 42 on the shaft 74, the multi-ply bundle 146 is supported by the U-shaped bracket 42 on the shaft which is below and aligned with the shaft 80, and the multi-ply bundle 148 is supported by the U-shaped bracket 42 on the shaft which is below and aligned with the shaft 84.

The sprocket chains 90, 92, 94 and 96 and the further sprocket chain, not shown, interconnect the sprocket pinions mounted on the shafts 65, 75, 80 and 84 and the other shafts, not shown. As a result, movement of the sprocket chain 90 will cause concomitant movement of all of the shafts 65, 75, 80, 84 and the other shafts not shown. Movement of the sprocket chain 90 is effected by movement of the piston 122 relative to the cylinder 110 of the air motor 108. While the movement of that piston will be a reciprocating movement, that reciprocating movement will be converted to rotating movement by the sprocket pinions secured to the shafts 65, 75, 80, 84 and the other shafts, not shown. As a result, each of the shafts 65, 75, 80, 84 and the other shafts, not shown, will respond to reciprocation of the piston 112 to rotate in the counterclockwise direction, to come to rest, and then to rotate in the clockwise direction to its initial position. The air motor 108 has adjustments thereon which enable the operator of the material-handling device to adjust the speed and the stroke of the piston 112; and, as a result, that operator is able to adjust the rate and angular extent of the oscillation of the shaft 65— and thus of all of the other shafts of that material-handling device. The timer 116 can be set to provide any desired period of time during which the shafts 65, 75, 80, 84 and the other shafts, not shown, will oscillate; and, at the end of that period of time, that timer will halt the flow of compressed air to the air motor 108.

In using the material-handling device of the present invention, the air motor 108 will be adjusted to provide the desired speed and length of stroke for the piston 112, and the timer 116 will be set to provide the desired period of time during which the shafts 65, 75, 80, 84 and the other shafts, not shown, are to oscillate. Thereafter, the setscrews 64 of the vise grip clamps 48 will be set to accommodate multi-ply bundles of the desired thickness, and the setscrews 140 of the weights 124 will be set to accommodate the lower ends of those bundles. The timer 116 will be actuated to start the air motor 108; but the handles 67, 71, 81 and 87 and the other handles, not shown, will be shifted into positions similar to those of handles 71 and 81 in FIG. 1. As a result, all of the inverted U-shaped brackets 42 will come to rest.

The multi-ply bundles will be formed by cutting a number of layers of cloth which have been laid on top of each other; and the long edges of the plies of those bundles will have a sealant sprayed onto them. As soon as a bundle has been sprayed, the operator of the material-handling device of the present invention will clamp the bundle-engaging surfaces 52 and 60 of a vise grip clamp 48 in engagement with the upper end of that bundle, as indicated particularly by FIGS. 2 and 3. Thereafter, that operator will dispose the lower end of that bundle between the bundle-engaging surfaces 133 and 141, respectively, of the rod 132 and the screw 140 of a weight 124. To facilitate the disposition of the lower end of that bundle between the bundle-engaging surfaces 133 and 141, the operator of the material-handling device will rotate the lever 136 until its axis parallel the axis of the rod 132. As that lever is so rotated, it will quickly shift the rod 132 to the left, and thus will quickly shift the bundle-engaging surface 133 far enough away from the bundle engaging surface 141 to permit the lower end of the multi-ply bundle to be disposed between those bundle-engaging surfaces. Thereafter the operator of the material-handling device will rotate the lever 136 back to the position indicated by FIG. 9, thereby quickly permitting the helical compression spring 130 to urge the bundle-engaging surface 133 on the rod 132 into sufficiently intimate engagement with the lower end of the multi-ply bundle to effectively secure the weight 124 to that bundle.

The vise grip clamps 48 will hold the upper ends of the plies of the various bundles in assembled relation, and the weights 124 will hold the bottoms of those plies in assembled relation. As a result, each of the multi-ply bundles can easily be handled as a unit. Once the operator of the material-handling device has secured a vise grip clamp 48 to the upper end of a multi-ply bundle and has secured a weight 124 to the lower end of that multi-ply bundle, he will lift that bundle by raising the rectangular frame 56; and he will set the pins 57 on that frame within the L-shaped slots 44 and 46 in the inverted U-shaped bracket 42. Thereupon, that operator will shift the handle of the clutch to a position similar to those of handles 67 and 87 in FIG. 1; and, immediately, the vise grip clamp 48 will be oscillated by the inverted U-shaped bracket 42.

When the timer 116 is actuated to cause compressed air to be supplied to the cylinder 110 of the air motor 108, that compressed air will initially force the piston 112 to move outwardly of that cylinder, and will thereby cause the sprocket chain 90 to move in a generally counterclockwise direction— thereby causing the various sprocket pinions and the various shafts to rotate in the counterclockwise direction. The inverted U-shaped brackets 42 secured to the bottoms of the various shafts will rotate in the counterclockwise direction and will cause the upper ends of the various multi-ply bundles to rotate in the counterclockwise direction. The multi-ply bundles will force the weights 124 to rotate in the counterclockwise direction, but these weights will initially lag behind the upper ends of those multi-ply bundles. Moreover, as the piston 112 reaches the outer limit of its path of reciprocation and comes to rest before it starts to move back toward its retracted position, the weights 124 will respond to their momentum and to the momentum of the lower ends of the multi-ply bundles to continue to rotate in the counterclockwise direction.

The sprocket chains, the shafts, the inverted U-shaped brackets 42, the frames 56, the vise grip clamps 48, and the upper ends of the multi-ply bundles will start rotating in the clockwise direction as soon as the piston 112 starts moving back toward its retracted position; but the weights 124 and the lower ends of those multi-ply bundles will, momentarily, continue to rotate in counterclockwise direction. This means that for a short period of time the bottoms of the multi-ply bundles will be rotating in the counterclockwise direction while the tops of those multi-ply bundles are rotating in the clockwise direction. The resulting "working" of the edges of the plies of those multi-ply bundles will apply shearing forces to any portions of the sealant which tend to bond those edges together.

As the piston 112 continues to move toward its retracted position, and thus causes the sprocket pinions, the shafts, the inverted U-shaped brackets 42, the frames 56, the vise grip clamps 48, and the upper ends of the multi-ply bundles to continue to rotate in the clockwise direction, the lower ends of those multi-ply bundles and the weights 124 will come to rest and then start rotating in the clockwise direction. When the piston 112 reaches its fully retracted position, the sprocket pinions, the shafts, the inverted U-shaped brackets 42, the frames 56, the vise grip clamps 48, and the upper ends of the multi-ply bundles will come to rest; but the weights 124 and the lower ends of the multi-ply bundles will continue to rotate in the clockwise direction.

As the piston 112 starts moving towards its extended position during the second cycle of operation of the air motor 108, the sprocket pinions, the shafts, the inverted U-shaped brackets 42, the frames 56, the vise grip clamps 48, and the upper ends of the multi-ply bundles will again start rotating in the counterclockwise direction; but, momentarily, the weights 124 and the lower ends of those multi-ply bundles will still be rotating in the clockwise direction. This means that for a short period of time the upper ends of the multi-ply bundles will be rotating in the counterclockwise direction while the lower ends of those multi-ply bundles are rotating in the clockwise direction. The resulting "working" of the edges of the plies of those multi-ply bundles will apply further shearing forces to any portions of the sealant which tend to bond those edges together.

Before the piston 112 reaches its extended position, the weights 124 and the lower ends of the multi-ply bundles will stop rotating in the clockwise direction and will again start rotating in the counterclockwise direction. Thereafter, as the piston 112 reaches its extended position during the second cycle of operation of the air motor 108, and thus causes the pinions, the shafts, the inverted U-shaped brackets 42, the frames 56, the vise grip clamps 48, and the upper ends of the multi-ply bundles to come to rest, the weights 124 and the lower ends of those multi-ply bundles will continue to rotate in the counterclockwise direction. Subsequently, as the piston 112 starts moving back to its retracted position during the second cycle of operation of the air motor 108, the upper ends of the multi-ply bundles will be moving in the clockwise direction, but, momentarily, the lower ends of those multi-ply bundles will be moving in the counterclockwise direction. Before that piston reaches its retracted position during the second cycle of operation of the air motor 108, the weights 124 and the lower ends of the multi-ply bundles will have come to rest and have started rotating in the clockwise direction. As the piston 112 again reaches its retracted position, the upper ends of the multi-ply bundles will come to rest but the weights 124 and the lower ends of those multi-ply bundles will still be rotating in the clockwise direction.

All of this means that at least twice during each cycle of operation of the air motor 108, the upper ends of the multi-ply bundles will be rotating in one direction while the lower ends of those multi-ply bundles are rotating in the opposite direction. Furthermore, it means that at least twice during each cycle of operation of that air motor, the upper ends of the multi-ply bundles will be at rest while the lower ends of those multi-ply bundles are still rotating. In addition, because the upper and lower ends of the multi-ply bundles come to rest at different times, those upper and lower ends are moving at different speeds at different times. The overall result is that the edges of the plies of the multi-ply bundles "work" and apply shearing forces to any portions of the sealant which tend to bond those edges together. Those shearing forces enable that sealant to dry without bonding the long edges of the multi-ply bundles together. Consequently, although the multi-ply bundles will remain as bundles, and can continue to be handled as bundles, the edges of those multi-ply bundles will not be bonded to each other. As a result, the plies of each multi-ply bundle can readily be separated from each other, whenever those plies are to be used in marking garments.

In one preferred embodiment of the present invention the air motor 108 rotates each of the shafts 65, 75, 80, 84 and the other shafts, not shown, a total of 90° in the counterclockwise direction, and then rotates those shafts a total of 90° in the clockwise direction during each cycle of operation of that air motor. However, that air motor can be adjusted to enable each of those shafts to rotate in the counterclockwise direction an angular distance in the range of zero to 230°, and then rotate back in the clockwise direction an equal number of degrees during each cycle of operation of that air motor. However, no matter how far the shafts rotate in the counterclockwise direction, the weights 124 and the lower ends of the multi-ply bundles will rotate even farther in that direction. Similarly, no matter how far the shafts rotate in the clockwise direction, the weights 124 and the lower ends of the multi-ply bundles will rotate even farther in that direction.

In the said one preferred embodiment of the present invention, the air motor 108 causes the shafts 65, 75, 80, 84 and the other shafts, not shown, to oscillate at a frequency of 1 cycle per second. However, that air motor can easily be adjusted to increase or decrease the lengths of the cycles of operation of those shafts.

The timer 116 will usually be set to continue the oscillation of the shafts until the sealant is dry enough so it is neither adhesive nor tacky. In the said one preferred embodiment of the present invention, the timer 116 continues the cycling of the shafts for a preset length of time in the range of 10 minutes to 1 hour. That length of time could be reduced by increasing the temperature of the room or area in which the material-handling device is operated. That length of time also could be reduced where a quicker-drying sealant or more absorbent plies were used. However, where a slower-drying sealant or less absorbent plies are used, the multi-ply bundles should be oscillated for a greater length of time.

The bundle-engaging surfaces 133 of the rods 132, and the bundle-engaging surfaces 141 of the screws 140 can be made in different sizes. However, in the said one preferred embodiment of the present invention, the diameter of each of those bundle-engaging surfaces is approximately one-tenth of the length of the bottom of a multi-ply bundle. The bundle-engaging surfaces 52 and 60 of the vise grip clamps 48 could be made as long as desired; but, in the said one preferred embodiment of the present invention, those bundle-engaging surfaces are made about one-third of the length of the upper edge of a multi-ply bundle. By making the bundle-engaging surfaces 52, 60, 133 and 141 narrower than the tops and bottoms of the multi-ply bundles, the present invention enables the entire lengths of the edges of those bundles to "work" and thereby enables the sealant on those edges to dry without bonding those edges together.

In the event the multi-ply bundles 142, 144, 146, 148 and the other bundles, not shown, are unusually long or are made of plies of unusually heavy and unusually pliant material, it may be possible to dispense with the weights 124. In that event, the masses of the lower portions of the multi-ply bundles will perform the functions of the weights 124—causing those lower portions to rotate farther than the upper ends of those multi-ply bundles rotate, to rotate at speeds which are different from the speeds at which those upper ends rotate, to come to rest while those upper ends are still rotating, to continue to rotate when those upper ends are still rotating, and to momentarily rotate in directions opposite to the directions of rotation of those upper ends.

The material-handling device provided by the present invention quickly and effectively permits the sealant to dry without permitting that sealant to bond together the adjacent edges of the plies of those multi-ply bundles. As a result, the edges of the various plies of the multi-ply bundles can be rendered fray-resistant without permitting those plies to adhere together.

Whereas the drawing and accompanying description have shown and described a preferred embodiment of the present invention it should be apparent to those skilled in the art that various changes may be made in the form of the invention without affecting the scope thereof.

What we claim is:

1. A device for drying sealant on the edges of a multi-ply bundle while keeping that sealant from bonding those edges to each other which comprises:
    a rotatable shaft,
    a motor that oscillates said shaft, and
    a gripping device that grips the top of said multi-ply bundle and that oscillates with said shaft,
    said bundle depending downwardly from said gripping device and responding to oscillations of the top thereof by said gripping device to cause the bottom thereof to oscillate,
    the bottom of said bundle continuing to rotate as the top of said bundle comes to rest during each oscillation of said top of said bundle, and
    the bottom of said bundle coming to rest during part of the rotation of said top of that bundle during each oscillation of said top of said bundle.

2. A device for drying sealant on the edge of a multi-ply bundle while keeping that sealant from bonding those edges to each other which comprises:

a rotatable shaft, a motor that oscillates said shaft, and a gripping device that grips the top of said multi-ply bundle and that oscillates with said shaft, said bundle dependingly downwardly from said gripping device and responding to oscillations of the top thereof by said gripping device to cause the bottom thereof to oscillate, the bottom of said bundle continuing to rotate as the top of said bundle comes to rest during each oscillation of said top of said bundle, and the bottom of said bundle coming to rest during part of the rotation of said top of that bundle during each oscillation of said top of said bundle, said shaft and said gripping device oscillating through an angular path in the range of zero to 230°.

3. A device for drying sealant on the edges of a multi-ply bundle while keeping that sealant from bonding those edges to each other as claimed in claim 1 wherein a separable connection is provided between said rotatable shaft and said gripping device, said separable connection enabling said gripping device to grip the top of said multi-ply bundle before said gripping device is connected to said rotatable shaft.

4. A device for drying sealant on the edges of a multi-ply bundle while keeping that sealant from bonding those edges to each other as claimed in claim 1 wherein said gripping device is a clamp with readily separable jaws, said readily separable jaws of said gripping device being movable away from each other to permit the top of said multi-ply bundle to be disposed between them and then being movable into gripping engagement with the top of said multi-ply bundle.

5. A device for drying sealant on the edges of a multi-ply bundle while keeping that sealant from bonding those edges to each other as claimed in claim 1 wherein said gripping device is a clamp with readily separable jaws, and wherein said gripping device locks said readily separable jaws thereof in engagement with the top of said multi-ply bundle to prevent accidental separation of said readily separable jaws from said top of said multi-ply bundle.

6. A device for drying sealant on the edges of a multi-ply bundle while keeping that sealant from bonding those edges to each other as claimed in claim 1 wherein a separable connection is provided between said rotatable shaft and said gripping device, said separable connection enabling said gripping device to grip the top of said multi-ply bundle before said gripping device is connected to said rotatable shaft, said separable connection including a bracket fixedly secured to said rotatable shaft and including a frame which supports and carries said gripping device.

7. A device for drying sealant on the edges of a multi-ply bundle while keeping that sealant from bonding those edges to each other as claimed in claim 1 wherein said gripping device has separable bundle-engaging surfaces, said separable bundle-engaging surfaces being elongated.

8. A device for drying sealant on the edges of a multi-ply bundle while keeping that sealant from bonding those edges to each other as claimed in claim 1 wherein said gripping device has separable bundle-engaging surfaces, said separable bundle-engaging surfaces being parallel to but disposed inwardly of the top of said multi-ply bundle, said separable bundle-engaging surfaces being elongated but being shorter than the top of said multi-ply bundle to enable the upper ends of the edges of said multi-ply bundle to "work."

9. A device for drying sealant on the edges of a multi-ply bundle while keeping that sealant from bonding those edges to each other which comprises:

a rotatable shaft, a motor that oscillates said shaft, a gripping device that grips the top of said multi-ply bundle and that oscillates with said shaft, said bundle depending downwardly from said gripping device are responding to oscillations of the top thereof by said gripping device to cause the bottom thereof to oscillate, the bottom of said bundle continuing to rotate as the top of said bundle comes to rest during each oscillation of said top of said bundle, and the bottom of said bundle coming to rest during part of the rotation of said top of that bundle during each oscillation of said top of said bundle, and a weight releasably secured to the bottom of said multi-ply bundle to coact with the mass of said bottom of said multi-ply bundle to rotate farther than said top of said multi-ply bundle rotates.

10. A device for drying sealant on the edges of a multi-ply bundle while keeping that sealant from bonding those edges to each other which comprises:

a rotatable shaft, a motor that oscillates said shaft, a gripping device that grips the top of said multi-ply bundle and that oscillates with said shaft, said bundle depending downwardly from said gripping device and responding to oscillations of the top thereof by said gripping device to cause the bottom thereof to oscillate, the bottom of said bundle continuing to rotate as the top of said bundle comes to rest during each oscillation of said top of said bundle, and the bottom of said bundle coming to rest during part of the rotation of said top of that bundle during each oscillation of said top of said bundle, and a weight releasably secured to the bottom of said multi-ply bundle to coact with the mass of said bottom of said multi-ply bundle to rotate farther than said top of said multi-ply bundle rotates, said weight having bundle-engaging surfaces that are narrower than said bottom of said multi-ply bundle to enable the lower ends of the edges of said multi-ply bundle to "work."

11. A device for drying sealant on the edges of a multi-ply bundle while keeping that sealant from bonding those edges to each other as claimed in claim 1 wherein a weight is releasably secured to the bottom of said multi-ply bundle to coact with the mass of said bottom of said multi-ply bundle to rotate farther than said top of said multi-ply bundle rotates, said weight having a movable bundle-engaging surface and a quick-release actuator therefor.

12. A device for drying sealant on the edges of a multi-ply bundle while keeping that sealant from bonding those edges to each other as claimed in claim 1 wherein said gripping device is a clamp with readily separable jaws, said readily separable jaws being adjustable to accommodate multi-ply bundles of differing thicknesses.

13. A device for drying sealant on the edges of a multi-ply bundle while keeping that sealant from bonding those edges to each other as claimed in claim 1 wherein a weight is releasably secured to the bottom of said multi-ply bundle to coact with the mass of said bottom of said multi-ply bundle to rotate farther than said top of said multi-ply bundle rotates, said weight having bundle-engaging surfaces that are adjustable to accommodate multi-ply bundles of differing thicknesses.

14. A device for drying sealant on the edges of a multi-ply bundle while keeping that sealant from bonding those edges to each other which comprises:

a rotatable shaft, a motor that oscillates said shaft, and a gripping device that grips the top of said multi-ply bundle and that oscillates with said shaft, said bundle depending downwardly from said gripping device and responding to oscillations of the top thereof by said gripping device to cause the bottom thereof to oscillate, the bottom of said bundle continuing to rotate as the top of said bundle comes to rest during each oscillation of said top of said bundle, and the bottom of said bundle coming to rest during part of the rotation of said top of that bundle during each oscillation of said top of said bundle, said gripping device having separable bundle-engaging surfaces, and a weight releasably secured to the bottom of said multi-ply bundle, said weight having separable bundle-engaging surfaces, said separable bundle-engaging surfaces of said gripping device being narrower than the top of said multi-ply bundle and said separable bundle-engaging surfaces of said weight being narrower than the bottom of said multi-ply bundle to enable the entire lengths of the edges of said multi-ply bundle to "work."

15. The method of drying sealant on the edges of a multi-ply bundle while keeping those edges from adhering to each other which comprises successively rotating one of said bundle in the clockwise and counterclockwise directions, permitting said rotation of said one end of said bundle to cause successive clockwise and counterclockwise rotation of the other end of said bundle, and permitting the rotation of said other end of said bundle to be different from the rotation of said one end of said bundle, so the edges of said bundle will "work" and will be kept from adhering to each other.

16. The method of drying sealant on the edges of a multi-ply bundle while keeping those edges from adhering to each other as claimed in claim 15 wherein said one end of said bundle is gripped at an area narrower than said one end of said bundle to enable the edges of said bundle adjacent said one end of said bundle to "work."

17. The method of drying sealant on the edges of a multi-ply bundle while keeping those edges from adhering to each other as claimed in claim 15 wherein said other end of said bundle has a weight releasably secured thereto, and wherein said other end of said bundle is gripped by said weight at an area narrower than said other end of said bundle to enable the edges of said bundle adjacent said other end of said bundle to "work."

18. The method of drying sealant on the edges of a multi-ply bundle while keeping those edges from adhering to each other which comprises successively rotating one end of said bundle in the clockwise and counterclockwise directions, permitting said rotation of said one end of said bundle to cause successive clockwise and counterclockwise rotation of the other end of said bundle, permitting the rotation of said other end of said bundle to be different from the rotation of said other end of said bundle, so the edges of said bundle will "work" and will be kept from adhering to each other said one end of said bundle being gripped at an area narrower than said one end of said bundle to enable the edges of said bundle adjacent said one end of said bundle to "work," said other end of said bundle having a weight releasably secured thereto, and said other end of said bundle being gripped by said weight at an area narrower than said other end of said bundle to enable the edges of said bundle adjacent said other end of said bundle to "work," whereby the entire lengths of said edges of said bundle will "work."

19. A device for drying sealant on the edges of a multi-ply bundle while keeping that sealant from bonding those edges to each other which comprises:

a rotatable shaft, a motor that oscillates said shaft, a gripping device that grips the top said multi-ply bundle and that oscillates with said shaft, said bundle depending downwardly from said gripping device and responding to oscillations of the top thereof by said gripping device to cause the bottom thereof to oscillate, the bottom of said bundle continuing to rotate as the top of said bundle comes to rest during each oscillation of said top of said bundle, and the bottom said bundle coming to rest during part of the rotation of said top of that bundle during each oscillation of said top of said bundle, and a clutch disposed between said motor and said shaft, said clutch being actuated to permit said gripping device to come to rest while said motor is operating.